Dec. 3, 1968  BUI-AI ETAL  3,413,837

KATHAROMETER BRIDGE

Filed June 23, 1966  4 Sheets-Sheet 1

INVENTORS:
BUI-AI, R. FIEUX,
G. GIRALT, R. LACOSTE

ATTORNEY:
a. a. Saffitz

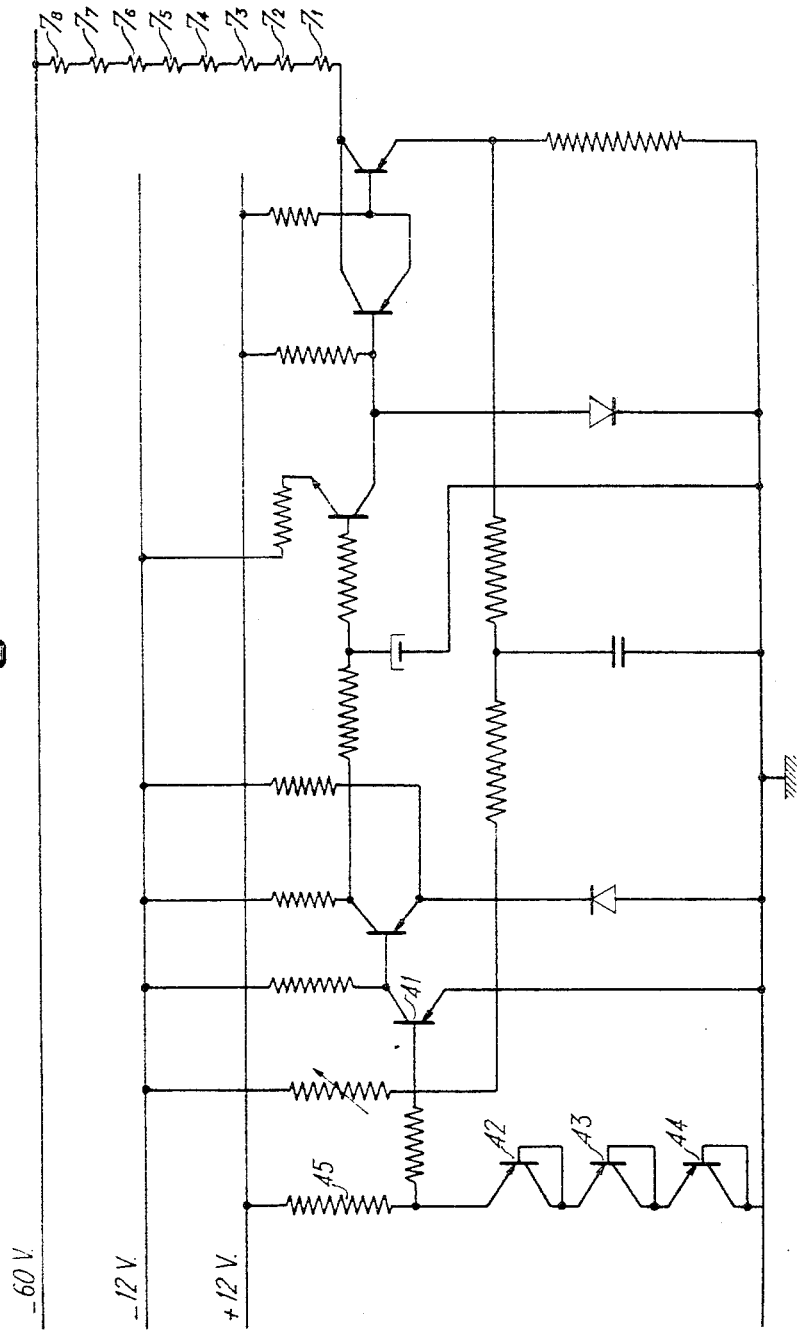

United States Patent Office 3,413,837
Patented Dec. 3, 1968

3,413,837
KATHAROMETER BRIDGE
Bui-Ai, Toulouse, Raymond P. Fieux, Paris, Georges A. Giralt, Balma, and Robert N. Lacoste, Toulouse, France, assignors to Centre National de la Recherche Scientifique, Paris, France, a corporation of France
Filed June 23, 1966, Ser. No. 559,976
Claims priority, application France, June 24, 1965, 22,150
6 Claims. (Cl. 73—27)

The present invention relates to an apparatus for determining the thermal conductivity of gases, known as a katharometer or more accurately as a bridge katharometer, in which the ratio of the thermal conductivities of a gas to be analyzed or detected and a reference gas is obtained by measuring the temperatures reached by two identical sources of heat applied with the same heating power and arranged to be cooled one in the gas to be analyzed and the other in the reference gas.

The considerable differences which exist between the thermal conductivities of various gases explain the high sensitivity of methods of analysis based on such apparatus.

In the katharometers of the prior art, the heating elements generally used are passive components, resistors or thermistors, electrically heated by the passage through them of a constant current, the variations of the characteristics of the said elements, usually variations of their resistance, being indicated when their temperature is modified as a function of the cooling due respectively to the gas to be analyzed and to the reference gas.

The object of the present invention is to increase the sensitivity of katharometer bridges.

According to the invention, active elements are used as sources of heat and as temperature detectors in a katharometer bridge, the active elements being either semiconductor diodes or transistors arranged as diodes, the characteristic measured to ascertain the temperature of the source being the voltage at the terminals of the junction of the diodes or the equivalent resistance in the forward direction and the voltage or equivalent base-emitter resistance in the forward direction for the transistors.

To assure the stability over a period of time of the active elements utilized, it is desirable to subject them to a preliminary ageing consisting of continuous operation of the apparatus of the invention for several days with the maximum intended current.

The absolute sensitivity of a katharometer bridge is given by the following expression:

$$\eta = k.i. \ R_{\theta_0} \alpha \frac{\theta - \theta_0}{\lambda}$$

in which:

$R_{\theta_0}$ is the resistance of the component at the temperature $\theta_0$ of the isothermal enclosure of the katharometer;
$\alpha$ is the coefficient of change of this resistance with temperature;
$\lambda$ is the thermal conductivity of the gas to be analyzed or detected; and
$i$ is the current flowing through the element constituting the source of heat.

$\alpha$ decreases as $i$ increases and it may even happen that the product $\alpha i$ decreases with $i$. But the difference $(\theta - \theta_0)$ increases much more rapidly with $i$. As a consequence the sensitivity increases with $i$ and it is therefore recommended to work with the highest current which the diode or transistor used can support without damage.

By way of example, for a silicon junction diode of type OA 200, when the current is changed from 1 to 100 ma., for $\theta_0 = 35°$ C., the coefficient $\alpha$ diminishes in the ratio 3 while the difference $(\theta - \theta_0)$ changes from 0.2 to 38.6° C., that is to say increases in the ratio 200. The sensitivity therefore increases in the ratio.

$$\frac{100 \times 200}{3} = \frac{2}{3} 10_4$$

The example of a diode OA 200 passing a current of 100 ma. gives performances which are slightly better than those of a platinum filament of a diameter of $30\mu$ for the same heating power of the two heat sources. The advantage becomes clearly in favour of the active element as a heat source and detector member for a current of 200 ma.

It is desirable to use diodes of very small dimensions, such as diodes without a solid envelope, protected simply by a varnish. In effect, the thermal resistance of a diode is increased by diminishing its dimensions; the temperature of its junction then becomes higher for a smaller current $i$; at the same time $R_{\theta_0}$ and $\alpha$ are increased.

Apart from the advantage from the viewpoint of sensitivity, due at the same time to the very nature of the thermal phenomena utilized and to the reduced volume of the components utilized, the solid diodes and transistors provide detector elements which are much less fragile, mechanically, than the resistive filaments the diameter of which must be very small if it is desired to obtain good performance. In the same way, their assembly is less delicate.

The invention will now be described in detail with reference to the attached drawings in which:

FIGURE 5 illustrates the electrothermal feedback circuit which serves to regulate the temperature of the isothermal enclosure;

Figure 1A:
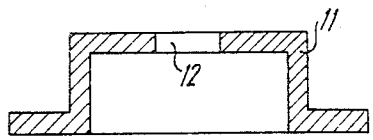
FIGURES 1a, 1b and 1c show in axial section and in a plan view from above, with the cover removed, the isothermal enclosure of the apparatus.
Figure 1B:
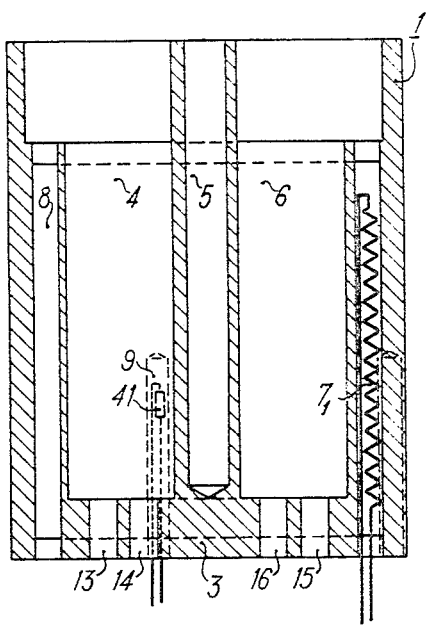
Figure 1C:
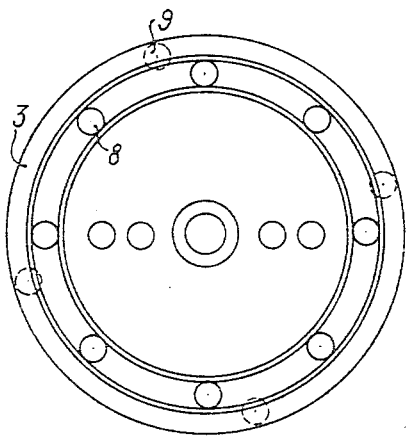
Figure 2A:
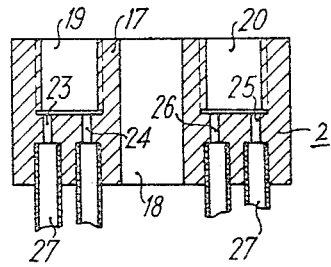
FIGURES 2a, 2b, 2c and 2d show the katharometer cell containing the diodes or the transistors.
Figure 2B:
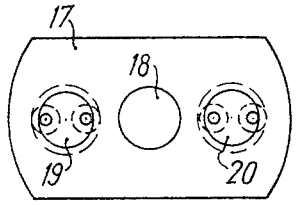
Figure 2C:
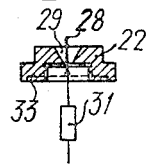
Figure 2D:
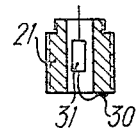

Referring to FIGURES 1a to 1c and 2a to 2d, the katharometer essentially comprises two parts, an isothermal enclosure 1 and a katharometer cell 2. The isothermal enclosure, which may be of aluminium for example, takes the form of a cylindrical casing 3 the interior of which is divided into two coaxial compartments 4 and 5 by an internal cylindrical partition 6. This partition 6 forms inside the enclosure a central column for the introduction of the katharometer cell 2. The compartment 5 is in use filled with mercury and serves to house a thermometer, not shown.

In the external wall of the casing there are formed longitudinal housings 8, extending for the whole of the height of the wall; in the example shown they are eight in number and contain heating resistors $7_1$ to $7_8$ of which only $7_1$ is shown. Other housings 9 are also drilled in the wall of the casing from its base and extend only over a part of the height of the wall. They contain diodes or transistors 41 to 44 serving as temperature pick-ups. These diodes or transistors and the heating resistors form an electrothermal feedback chain which permits the regulation of the temperature in the enclosure and the arrangement and operation of which will be explained later.

A cover 11 fits on the casing; it is provided with a hole 12 to permit the passage of the thermometer stem.

Passages 13–14 and 15–16, the axes of which are aligned on a diametral plane of the casing 1, extend through the base of the casing. These are intended for the passage of inlet and outlet tubing, forming part of the cell 2, for the gas to be analyzed and the reference gas.

The katharometer cell 2 is constituted by a cylinder 17, of brass for example, the cross-section of which is in the form of a segment of a circle and which is traversed by a central hole 18 through which passes in a low-friction manner the column 6 of the enclosure. Two diametrically opposite cavities 19 and 20, internally threaded, are formed in the cell, two pairs of holes 23–24 and 25–26 extending from the bases of these cavities; in enlargements of these holes there are fixed, by soldering for example, the gas inlet and outlet tubings which, when the cell is mounted in the enclosure, pass respectively through the holes 13–14 and 15–16.

Two detector units are housed in the cavities 19 and 20. Each of these units is in the form of a casing 21 with a threaded cover 22. A conductive wire 28 passes through the lid by means of an insulating and fluid-tight seal such as a glass pearl 29. One of the connections of each detector diode 31 or 32 is soldered to the conductive wire 28 of the lid and the other connection is soldered to the body of the casing 21 at 30, after the lid has been screwed on to the casing. The diode (31 for example) is thus maintained on the axis of the casing 21. This latter is externally threaded and can be screwed into one of the compartments 19 or 20. To prevent any leakage of gas to be analyzed and of reference gas from the cavities 19 and 20, the cover 22 is larger than these cavities and seats on the upper face of the cell 2 with the interposition of a toroidal seal not shown, of neoprene for example, housed in the groove 33.

Figure 3:
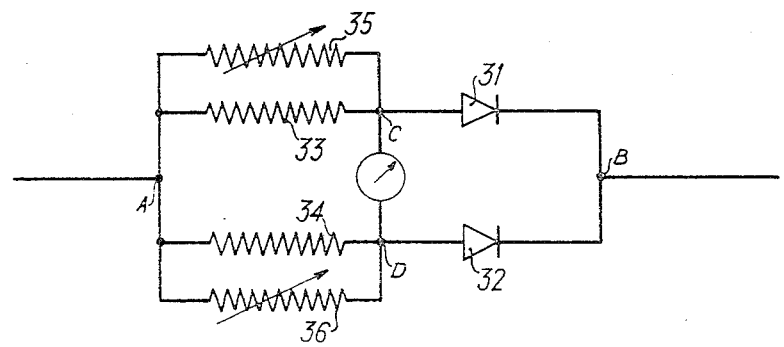
FIGURE 3 shows the electrical circuit of the katharometer bridge.

FIGURE 3 shows the circuit of the katharometer bridge. 31 and 32 are the two diodes housed in the casings 21. They are arranged to form a bridge with two resistors 33 and 34 of the order of a few tens of ohms. Adjustable resistors 35 and 36 are placed respectively in parallel with the resistors 33 and 34 and served for zero adjusting. The bridge is fed between points A and B by a stabilised voltage source. The unbalance voltage is measured between points C and D.

Figure 4:
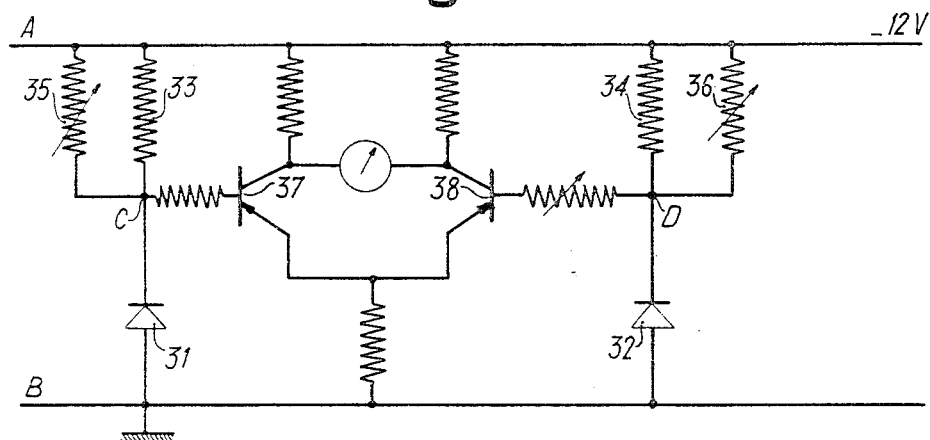
FIGURE 4 shows the bridge of FIGURE 3 and additionally includes a differential amplifier.

In order to increase the sensitivity of the bridge, a differential amplifier constituted by the two transistors 37 and 38 (FIGURE 4), placed in the thermostatic enclosure defining the katharometer, can be added to the bridge.

The temperature of the enclosure must be maintained strictly constant and any temperature control process can be used. FIGURE 5 indicates a process of the prior art. The device utilised is constituted by a transistor DC amplifier. The base of the input transistor 41 is biased by a voltage divider comprising three transistors 42, 43 and 44, arranged as diodes by short-circuiting their bases and collectors and connected in series, and a resistor 45. The load of the amplifier is formed by a number of resistors in series, eight in the apparatus described, indicated by $7_1$ to $7_8$. The resistors $7_1$ to $7_8$ are placed in the housings 8 of the enclosure 1 and the transistors 41–44 are placed in the housings 9 of this same enclosure. The transistors are thus subjected to the action of heating resistors and, in view of the fact that the resistance of the base-emitter junction of a transistor decreases when the temperature increases, the current in the output resistance decreases when the temperature of the transistors 41–44 increases, as shown in FIGURE 5, and this leads to a reduction of the temperature of the said transistors.

Figure 6:
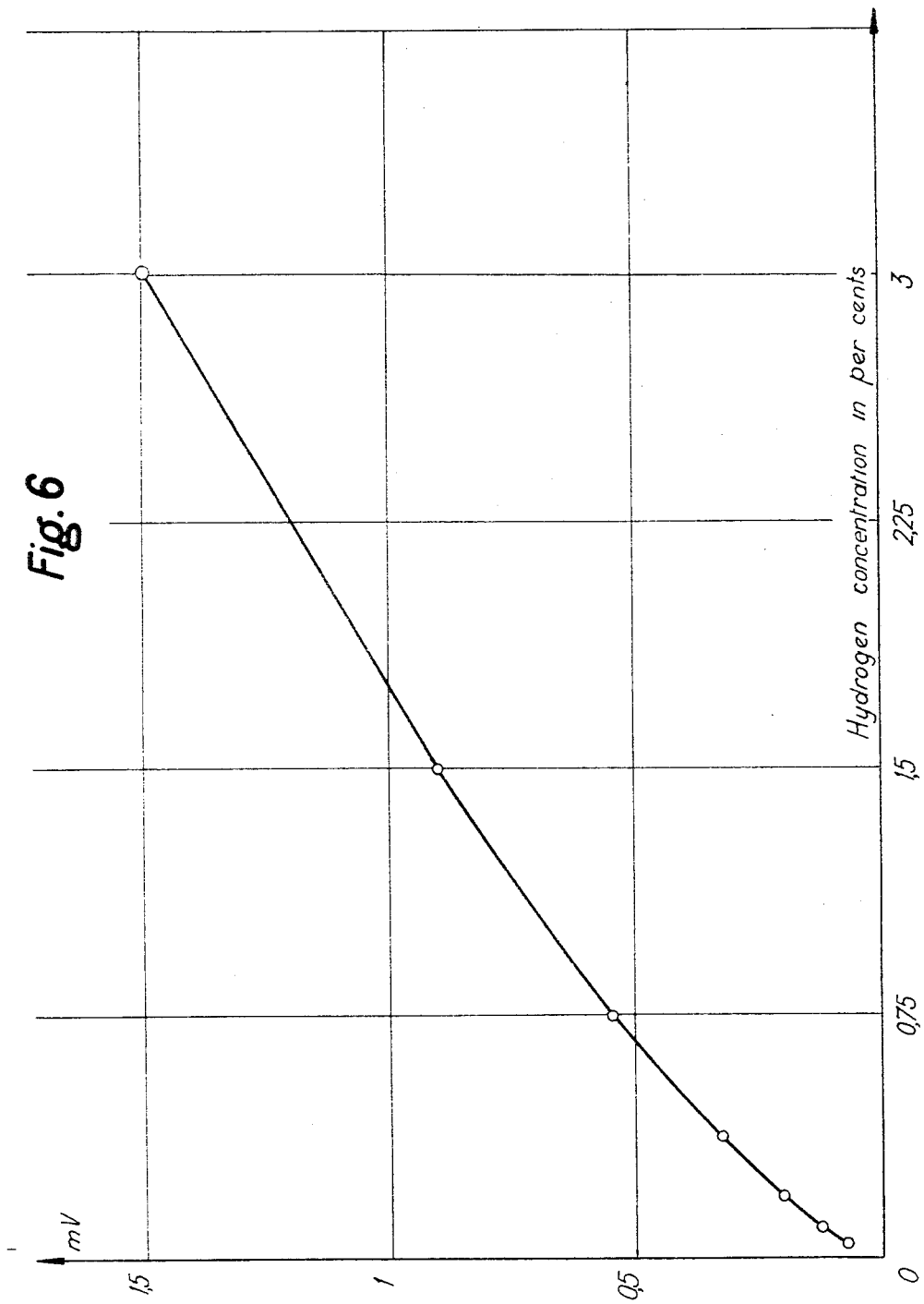
FIGURE 6 is a curve showing the variation of the unbalance voltage of the bridge as a function of the composition of a hydrogen-air mixture, the reference gas being air and the unbalance being measured without amplification.

FIGURE 6 is a curve showing, in static working, the unbalance voltage of the bridge of FIGURE 3 as a function of the composition of a hydrogen-air mixture, the reference gas being air. The minimum measurable concentration of hydrogen is of the order of $5.10^{-4}$; it is possible to extend this to $10^{-4}$ by using the amplifier of FIGURE 4.

Figure 7:
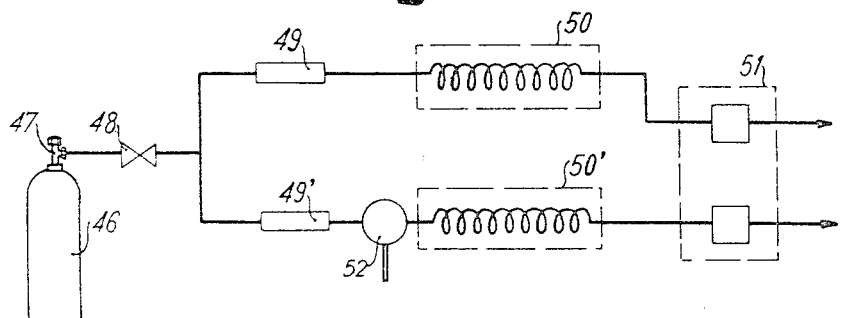
FIGURE 7 shows an arrangement in which the apparatus of the invention is used for gaseous phase chromatography.

FIGURE 7 shows the use of the katharometer of the invention in a dynamic system.

The vector gas, which is nitrogen supplied by the bottle 46, is reduced in pressure by a reducing valve 47 to a pressure close to that of normal atmospheric pressure and its flow is regulated by a needle valve 48. It then passes into two channels in each of which there is a rotameter, 49 and 49′ respectively, then a separating column, 50 and 50′ respectively, and finally the two housings of the cell 51 of the katharometer according to the invention. In one of these two channels an inlet valve 52 permits the introduction of the gas the concentration of which is to be measured. For an inlet of 3 cm.³ of hydrogen at normal pressure, a concentration of hydrogen in the nitrogen of the order of $10^{-3}$ can be measured.

What we claim is:

1. A katharometer apparatus for the determination of the relative thermal conductivity of a gas comprising an enclosure, means for thermostatically controlling the said enclosure, two housings within the enclosure, means for filling the said housings respectively with a gas to be analyzed and a reference gas, and within each housing a diode thermally isolated from the walls of the said housing and through which flow equal currents in the forward direction, the said diodes serving as heat sources which are cooled respectively in the gas to be analyzed and in the reference gas, and means for measuring the ratio of the resistances of the diodes in the forward direction, the said ratio being equal to the ratio of the thermal conductivities of the gas to be analyzed and the reference gas.

2. Apparatus as set forth in claim 1, in which the diodes are constituted by transistors of which the base and collector are short-circuited.

3. A katharometer apparatus for the determination of the relative thermal conductivity of a gas comprising an enclosure, means for thermostatically controlling said enclosure, two housings within the enclosure, means for filling the said housings respectively with a gas to be analyzed and a reference gas, two hollow cylindrical open-ended casings adapted to be respectively inserted within said two housings and to communicate therewith, two diodes axially arranged in said casings and thermally isolated from the walls thereof, means for applying equal currents in the forward direction to said diodes, the said diodes serving as heat sources which are cooled respectively in the gas to be analyzed and in the reference gas, and means for measuring the ratio of the resistances of the diodes in the forward direction, the said ratio being equal to the ratio of the thermal conductivities of the gas to be analyzed and the reference gas.

4. Apparatus as set forth in claim 3, in which the housings are internally threaded and the casings are externally threaded and are screwed into the housings.

5. Apparatus as set forth in claim 3, in which the casings comprise a cover having a fluid-tight and isolating seal at its center, a wire passing through the cover and the diodes are respectively arranged along the axes of the casings, one of their connections being soldered to the said wire and the other connection being brought to the body of the casing.

6. A katharometer apparatus for the determination of the relative thermal conductivity of a gas comprising an enclosure, first housings in the wall of said enclosure, heating resistors in said first housings, second housings in the wall of said enclosure, temperature responsive devices in said second housings adapted to produce an output signal, an amplifier having an input receiving said signal and an output connected to said heating resistors, said heating resistors, said temperature responsive devices and amplifier constituting an electro-thermal feedback chain which maintains constant the temperature of the enclosure, a pair of third housings within the enclosure, means for filling the said third housings respectively with a gas to be analyzed and a reference gas, and within each third housing a diode thermally isolated from the walls of the said third housing and through which flow equal currents in the forward direction, the said diodes serving as heat sources which are cooled respectively in the gas to be analyzed and in the reference gas, and means for measuring the ratio of the resistances of the diodes in the forward direction, the said ratio being equal to the ratio of the thermal conductivities of the gas to be analyzed and the reference gas.

References Cited

UNITED STATES PATENTS

| | | | |
|---|---|---|---|
| 3,075,379 | 1/1963 | Schmauch | 73—27 |
| 3,184,953 | 5/1965 | Petrocelli | 73—27 |

RICHARD C. QUEISSER, *Primary Examiner.*

C. I. McCLELLAND, *Assistant Examiner.*